May 7, 1946.  C. R. HAGEN  2,399,733
POWER TAKE-OFF THROUGH TRACTOR STEERING COLUMN
Filed March 19, 1945   2 Sheets-Sheet 1

May 7, 1946.  C. R. HAGEN  2,399,733
POWER TAKE-OFF THROUGH TRACTOR STEERING COLUMN
Filed March 19, 1945  2 Sheets-Sheet 2

Inventor:
Clarence R. Hagen,
By Paul O. Pippel
Attorney.

Patented May 7, 1946

2,399,733

UNITED STATES PATENT OFFICE 2,399,733

POWER TAKE-OFF THROUGH TRACTOR STEERING COLUMN

Clarence R. Hagen, Chicago, Ill., assignor to International Harvester Company, a corporation of New Jersey Application March 19, 1945, Serial No. 583,587

6 Claims. (Cl. 180—53)

This invention concerns a power take-off from the engine of a tractor and relates particularly to an arrangement in which a power take-off shaft projects forwardly from the engine crank shaft into intersecting relationship with the axis of a steering shaft or column and a bridge or oversize opening structure within said steering shaft to accommodate the projection of the power take-off shaft therein.

In certain types of tricycle type tractors wherein the front of the tractor is supported upon a pivotal steering truck, pivoting of the truck is obtained by means of a steering structure comprising a vertical shaft or column extending vertically upwardly from the truck. It is desirable that this vertical steering column or shaft shall be within a vertical plane which is also coincident with the rotational axis of the engine crank shaft so that the symmetry of the structure will obtain.

In tractors of this character, a problem has existed in connection with obtaining power from a pulley or the like driven from the front end of the crank shaft. Insufficient room for a power take-off pulley has been available between the front end of the crank shaft and the engine radiator, and until the present invention, so far as this applicant is aware, no one has devised an arrangement wherein the power take-off shaft is projected coaxially forwardly from the front end of the crank shaft past the vertical steering shaft which pivots about an axis intersecting the forward projecting axis of the crank shaft. The general object of this invention is the provision of a power take-off arrangement as that just referred to whereby a conveniently accessible power take-off pulley or the like may be made available on the front end of the vehicle.

Referring now to the drawings.

Figure 1:
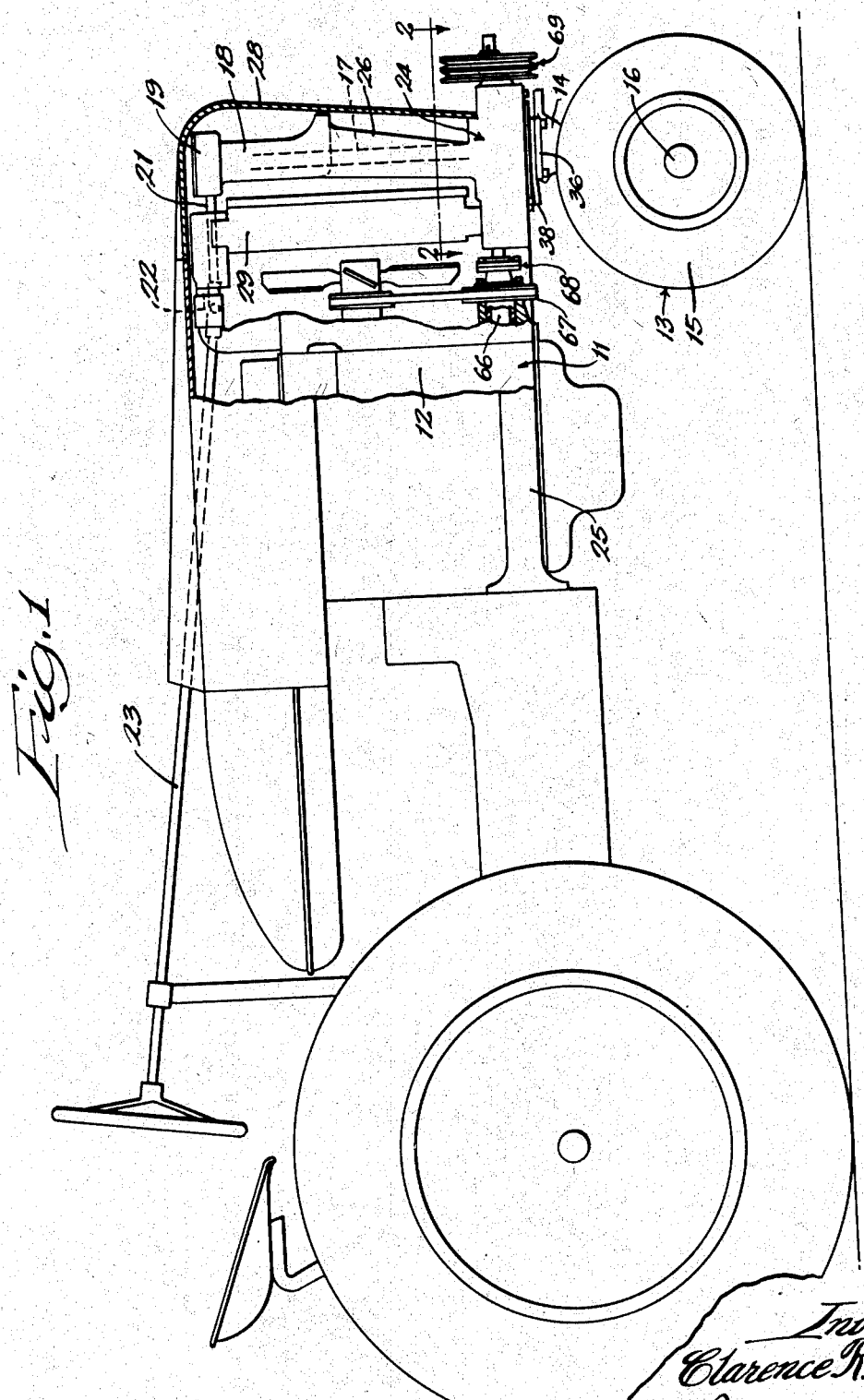
Fig. 1 is a side elevational view of a tractor with parts of its body broken away near the front or right end to illustrate the installation of a preferred form of the invention thereon.

The tractor shown in Fig. 1 has the forward end of its body 11, comprising an engine 12, supported upon a steering truck 13. This steering truck comprises a pedestal or shank 14 disposed between a pair of closely axially spaced rubber tired wheels 15 journaled upon spindles 16 projecting oppositely from the lower end of said shank.

The steering truck shank 14 is arranged coaxially with a vertical steering shaft 17 and constrained from rotation therewith. Shaft 17 projects upwardly through a hollow bracket 18 and carries a gear, not shown, at its upper end within a housing 19. Said gear on the upper end of the shaft 17 meshes with and is driven by a worm pinion, not shown, on the front end of a shaft 21, which through a universal joint 22 is rotatable by a steering wheel shaft 23.

Bracket 18 is cast integrally with a base 24 which forms a front end portion of the tractor body and is connected to the engine 12 by sills 25 projecting along the sides of the engine. The upper portion of the bracket 18 that contains the vertical steering shaft 17 is joined to the base 24 by a pair of downwardly diverging hollow legs 26 and 27; see Fig. 2. Bracket 18 is enclosed by the front end of the engine hood 28 and is immediately ahead of the radiator 29 of the engine cooling system.

A large opening 31 in the lower side of the hollow casting 24 is recessed at 32 for receiving the outer race of a ball bearing unit 33. Said outer bearing unit race is clamped against a shoulder 33ª of the casting by a retaining ring 34 which is held in place by cap screws 35. An enlarged upper end portion of the truck shank 14 comprises a flange 36 and upon this flange there rests a rectangular plate 37 having a rearwardly projecting tail portion 38. Superposed on the plate 37 is a circular plate 39 having a reduced diameter portion 41 projecting partly into the inner race of the ball bearing unit 33. A flange 42 on the outer and lower end of the circular plate 39 cooperates with a ring 43 on said reduced portion 41 thereof in retaining an oil seal ring 44 for the bearing unit 33 in place. Bearing retainer ring 34 cooperates with the flange 42 and the ring 43 in confining the sealing ring 44 and in establishing a dirt-proof seal for the lower end of the bearing unit. The ring 43 is compressed between a portion of the plate 39 and the lower end of the bearing unit inner race for supporting the front end of the tractor. Supporting force for the tractor is transmitted from the inner race through the balls of the bearing unit to the outer race and thence onto the seat 33ª formed in the hollow casting 24.

An enlarged lower end portion for the vertical steering column or shaft 17 comprises a cylindrical portion 45 and projected snugly in the inner race of the bearing unit 33. A compression ring 46 similar to the ring 43 is interposed between a shoulder 47 on the enlarged lower end of the shaft 17 and the upper end of the bearing unit inner race. This ring 46 cooperates with a flange 48 on said enlarged lower end and with the adjacent circumscribing portion of the casting 24 in confining a sealing ring 49 in position for excluding foreign matter from the upper end of the bearing unit 33 and for retaining lubricant within said unit. The flange 36 on the upper end of the steering truck stem 14, the plates 37 and 39, and the enlarged lower end portion of the shaft 17 contain four axially alined holes for receiving the shanks of cap screws 51. The holes for said cap screws in the enlarged lower end of the shaft 17 are threaded so that when said cap screws are turned into these threaded holes, the parts will be drawn axially together and the rings 43 and 46 will be clamped tightly onto the opposite ends of the inner race of the ball bearing unit 33 whereby the shaft 17, said inner race, the steering truck, and the parts traversed by the shanks of the cap screws 51 will all be constrained for rotation in unison.

An opening 52 is formed in the enlarged lower end portion of the shaft 17 for receiving a power take-off shaft 53. Opening 52 is formed within a relatively narrow bridge 54 superposed on and extending diametrically across the circular flange 48. End supporting portions 55 at the ends of the cross member 56 of the bridge are formed with concave faces 57, 58, 59, and 61 directed radially of the structure to provide adequate clearance for the power take-off shaft 53 when the structure is pivoted pursuant to imparting pivotal steering movement to the truck 13.

Figure 2:
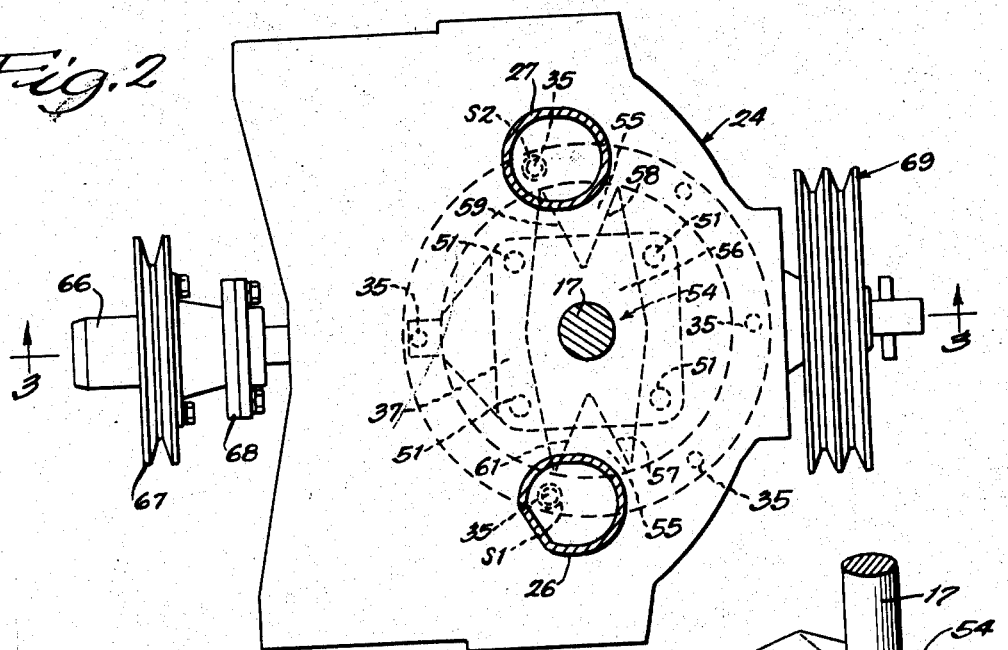
Fig. 2 is a horizontal view looking downwardly at the plane indicated by the line 2—2 in Fig. 1.
Figure 5:
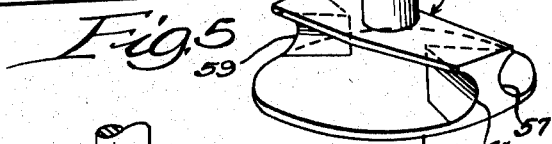
Fig. 5 is a perspective view of the lower end of the steering shaft.
Figure 4:
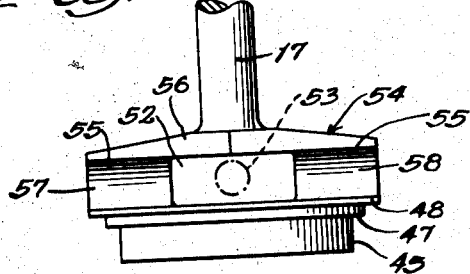
Fig. 4 is a side elevational view of a lower enlarged end portion of the steering shaft or column.

Avoidance of abutment of the power take-off shaft 53 by the bridge end portions 55 is obtained by cooperation between the tail 38 on the plate 37 and elongated heads S1 and S2 on two of the bolts 35 as illustrated in Fig. 2. These bolt heads S1 and S2 project downwardly sufficiently far to be abutted by the tail 38 for limiting steering pivotal movement of the truck 13 before contact is had by either of the bridge end portions 55, Fig. 4, with the power take-off shaft.

Figure 3:
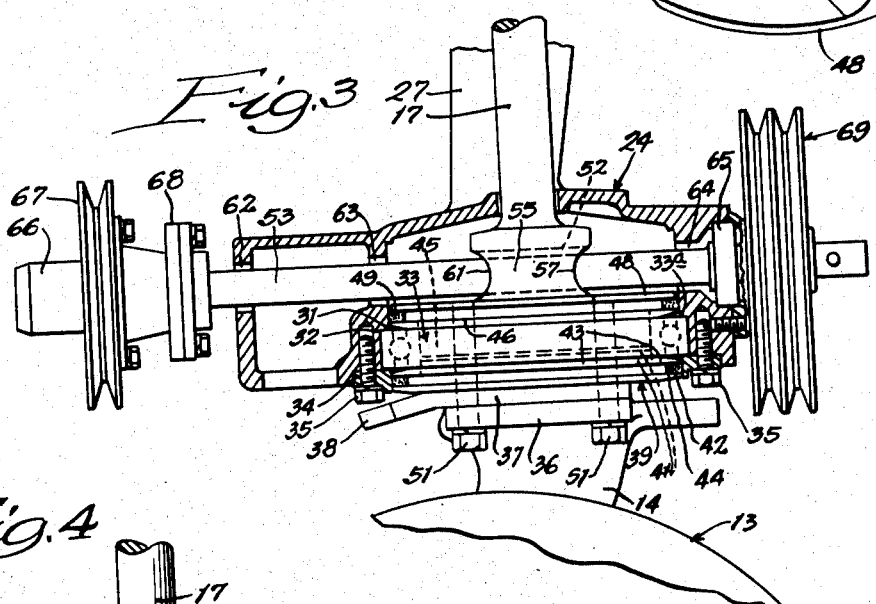
Fig. 3 is a vertical sectional view through the steering and power take-off structure taken at the plane indicated by the line 3—3 in Figure 2.

Holes 62, 63, and 64, Fig. 3, are provided in the casting 24 to accommodate the power take-off shaft. A front end portion of said power take-off shaft is journaled in a bearing unit 65. Rotative force is transmitted to the power take-off shaft from the front end of the engine crank shaft 66, Fig. 1, through the hub of a fan belt drive pulley 67 and a coupling device 68. A power take-off pulley 69 is secured non-rotatably to the outer end of the power take-off shaft.

Having thus described the preferred form of the invention with the view of clearly illustrating the same, I claim:

1. In a tractor having a steering truck disposed below and forwardly of the engine crank shaft, a steering structure with which said steering truck is constrained for steering pivoting and projecting upwardly from an operative connection therewith, said steering structure having a clearance bridge in a portion thereof in axial registration with said crank shaft, and a power take-off shaft projecting forwardly from said crank shaft through said clearance bridge.

2. In a tractor, an engine with a fore and aft extending crank shaft, a steering truck disposed forwardly of said engine in supporting relation thereto and having a journaled connection therewith to facilitate steering pivoting of the truck about a vertical axis, a steering structure connected with the steering truck to steeringly pivot the same and projecting upwardly therefrom, said steering structure having a clearance bridge in a portion thereof in axial registration with said crank shaft, and a power take-off shaft projecting forwardly from said crank shaft through said clearance bridge.

3. In a tractor, a body including an engine with a fore and aft extending crank shaft, a steering truck bearing disposed forwardly of said crank shaft and with its axis in an upright position, a steering truck in journaled relation with said bearing to support the forward part of said body and pivoted in the bearing to steer the tractor, a steering structure projecting upwardly from said truck coaxially with said bearing, means operatively connecting said steering structure with said truck for steering pivoting of the same, said steering structure having an opening therein in axial registry with the crank shaft, and a power take-off shaft projecting from the crank shaft through said opening, and said opening being oversize with respect to said power take-off shaft to facilitate steering pivoting of the steering structure and of the truck without interference by said shaft.

4. In a tractor, a body including an engine with a fore and aft extending crank shaft, a steering truck bearing unit mounted on said body forwardly of said crank shaft and with its axis in an upright position, said bearing unit including an outer race secured to said body and a freely rotatable inner race, a steering truck having a shank arranged coaxially with said bearing unit and projecting downwardly therefrom, a steering structure projecting upwardly from the bearing unit coaxially therewith, means projecting into the bearing unit and connecting said shank and said structure to the inner race thereof for rotation in unison therewith, a power take-off shaft projecting from the crank shaft diametrically across the bearing unit, and said steering structure having an opening receiving said shaft and oversize with respect thereto to facilitate steering pivoting of said structure and of the truck without interference by said shaft.

5. In a tractor, a body including an engine with a fore and aft extending crank shaft, a steering truck bearing unit mounted on said body forwardly of said crank shaft and with its axis in an upright position, said bearing unit including an outer race secured to said body and a freely rotatable inner race, a steering truck having a shank arranged coaxially with said bearing unit and projecting downwardly therefrom, said shank having an enlarged upper end portion, a steering structure comprising a shaft projecting upwardly from said bearing unit coaxially therewith and having an enlarged lower end portion, means for connecting said enlarged end portions and the inner race of said bearing unit together for causing their unitary rotation comprising members projecting through the inner race of said bearing unit and interconnecting said enlarged end portions, a power take-off shaft projecting from the crank shaft diametrically across and above the bearing unit, and said enlarged end portion of the steering structure shaft having an opening receiving said power takeoff shaft and oversize with respect thereto to facilitate steering pivoting of said structure and of said truck without interference by said power take-off shaft.

6. In a tractor, a body including an engine with a fore and aft extending crank shaft, a steering truck bearing unit mounted on said body forwardly of said crank shaft and with its axis in an upright position, said bearing unit including an outer race secured to said body and a freely rotatable inner race, a steering truck having a shank arranged coaxially with said bearing unit and projecting downwardly therefrom, said shank having an enlarged end portion at its upper end, a steering structure comprising a shaft projecting upwardly from said bearing unit coaxially therewith and having an enlarged lower end portion, means interconnecting said enlarged end portions for causing them and the inner race of said bearing unit to rotate in unison, a power take-off shaft projecting from the crank shaft diametrically across and above said bearing unit, the lower end portion of said steering structure shaft having an opening receiving said power take-off shaft and oversize with respect thereto to facilitate steering pivoting of said structure and of said truck, stop means on said body and spaced circumferentially of the truck shank, and means rotatable with said truck shank for alternative engagement with said stop means to limit pivoting of the truck to prevent abutment of the material at the sides of said opening with the power take-off shaft.

CLARENCE R. HAGEN.